(12) United States Patent
Tabe (10) Patent No.: US 6,485,108 B1
(45) Date of Patent: Nov. 26, 2002

(54) BICYCLE HUB

(75) Inventor: Koshi Tabe, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/870,020

(22) Filed: May 31, 2001

(51) Int. Cl.[7] .................. B60B 1/02; B60B 21/06; B60B 27/00
(52) U.S. Cl. .................. 301/59; 301/56; 301/110.5
(58) Field of Search .............. 301/55, 56, 59, 301/105.1, 110.5, 58, 61, 74, 110.6

(56) References Cited

U.S. PATENT DOCUMENTS

| | | | |
|---|---|---|---|
| 553,616 A | | 1/1896 | Handloser |
| 5,429,421 A | * | 7/1995 | Watson ................ 301/110.5 |
| 5,626,401 A | * | 5/1997 | Terry et al. ............ 301/104 |
| 5,795,036 A | | 8/1998 | Campagnolo |
| 5,882,088 A | | 3/1999 | Yahata |
| 6,010,197 A | | 1/2000 | Crosnier et al. |
| 6,309,028 B1 | * | 10/2001 | Kanehisa et al. ...... 301/110.5 |
| 6,352,314 B1 | * | 3/2002 | Tabe ..................... 188/26 |
| 6,354,669 B1 | * | 3/2002 | Tabe ..................... 301/110.5 |

FOREIGN PATENT DOCUMENTS

| | | |
|---|---|---|
| DE | 99859 | 12/1897 |
| DE | 8703618 | 7/1987 |
| EP | 0764551 A1 | 3/1997 |
| JP | 4511628 | 5/1970 |
| JP | 2000264006 A | 9/2000 |

* cited by examiner

*Primary Examiner*—S. Joseph Morano
*Assistant Examiner*—Jason R. Bellinger
(74) *Attorney, Agent, or Firm*—Shinjyu Global IP Counselors, LLP (57) ABSTRACT

A bicycle hub is provided for use with tangential bicycle spokes. The bicycle hub includes a hub axle and a hub body. The hub axle has a set of spoke openings. The spoke openings are circumferentially arranged around the hub body and extend between the external and internal surfaces. Each of the spoke openings has an enlarged insertion portion and a retaining portion. An internal head receiving seat is preferably located adjacent each of the retaining portions. An internal abutment is preferably arranged between each of the insertion portions and each of the head receiving seats. The external surface, the head receiving seats and the abutments are configured to retain the bent ends of the spokes. The external surface preferably has a flute portion extending from each of the retaining portions. The retaining portions and the flute portions are configured to retain the bent ends of the spokes.

21 Claims, 9 Drawing Sheets

BICYCLE HUB

BACKGROUND OF THE INVENTION

1. Field of the Invention

This invention generally relates to a bicycle hub. More specifically, the present invention relates to a bicycle hub that uses conventional tangential spokes.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. Recently, the braking systems for bicycles have included the use of disc brakes. The use of disc brakes has resulted in modifications to the bicycle hub of the bicycle wheel so that a brake rotor can be mounted thereon.

The most basic bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with flanges that are used to couple the spokes to the hub. In particular, holes are provided in the hub flanges. The wire spokes are usually bent on their inner end and provided with an enlarged head or flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim.

With a spoke constructed in this manner, the nipples are installed in nipple holes formed in the rim. The spokes are inserted sideways through the holes in the hub flange until the enlarged heads of the spokes engage the areas surrounding the holes in the hub flange. The male threads on the ends of the spokes are threaded into the female threads of the spoke nipples installed in the openings of the rim.

When the hub is a brake disc hub or is a rear hub, installation and/or replacement of the spokes can be difficult. In the case of a disk brake hub, one end of the hub usually has a rotor mounting portion. Often, the rotor mounting portion is a plurality of blind bores that receive bolts to directly mount the brake disc rotor to the end of the hub. Thus, the brake disc rotor makes it difficult to insert the spokes in a sideways direction. Likewise, if the hub is a rear hub, the sprockets can be obstacles to install or replace spokes.

In view of the above, there exists a need for a bicycle hub which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub in which the spokes are easily installed.

Another object of the present invention is to provide a bicycle hub that can use conventional tangential spokes.

Another object of the present invention is to provide a bicycle hub that is relatively lightweight in that no spoke flanges are needed.

Another object of the present invention is to provide a bicycle hub that can be used to mount a brake disc rotor thereto.

The foregoing objects can basically be attained by providing a bicycle hub for use with tangential bicycle spokes having a straight section and a bent end with an enlarged head such that straight section extends at an angle of about 95° relative to the bent end. The bicycle hub includes a hub axle and a hub body. The hub axle has a center axis extending between a first end and a second end. The hub body has an interior passageway with the hub axle rotatably supported therein, an external surface, an internal surface and a set of first spoke openings. The first spoke openings are circumferentially arranged around the hub body and extend between the external and internal surfaces. Each of the first spoke openings has an insertion portion and a retaining portion. Each insertion portion has a large width that is so dimensioned to permit the enlarged head of a tangential spoke to pass therethrough. Each retaining portion has a width that is so dimensioned smaller than the width of the insertion portion to retain the enlarged head of the tangential spoke therein. The internal surface has an internal head receiving seat located adjacent each of the retaining portions of the first spoke openings and an internal abutment arranged between each of the insertion portions and each of the head receiving seats.

The foregoing objects can also basically be attained by providing a bicycle hub for use with tangential bicycle spokes having a straight section and a bent end with an enlarged head such that straight section extends at an angle of about 95° relative to the bent end. The bicycle hub includes a hub axle and a hub body. The hub axle has a center axis extending between a first end and a second end. The hub body has an interior passageway with the hub axle being rotatably supported therein, an external surface, an internal surface and a set of first spoke openings. The first spoke openings are circumferentially arranged around the hub body and extend between the external and internal surfaces. Each of the first spoke openings has an insertion portion and a retaining portion. Each insertion portion has a large width that is so dimensioned to permit the enlarged head of a tangential spoke to pass therethrough. Each retaining portion has a width that is so dimensioned smaller than the width of the insertion portion to retain the enlarged head of the tangential spoke therein. The internal surface has an internal head receiving seat located adjacent each of the retaining portions of the first spoke openings and an internal abutment arranged between each of the insertion portions and each of the head receiving seats. The external surface, the head receiving seats and the abutments are dimensioned and configured to retain the bent ends of the spokes in the retaining portions of the first spoke openings.

The foregoing objects can also basically be attained by providing a bicycle hub for use with tangential bicycle spokes having a straight section and a bent end with an enlarged head such that straight section extends at an angle of about 95° relative to the bent end. The bicycle hub includes a hub axle and a hub body. The hub axle has a center axis extending between a first end and a second end. The hub body has an interior passageway with the hub axle being rotatably supported therein, an external surface, an internal surface and a set of first spoke openings. The first spoke openings are circumferentially arranged around the hub body and extend between the external and internal surfaces. Each of the first spoke openings has an insertion portion and a retaining portion. Each insertion portion has a large width that is so dimensioned to permit the enlarged head of a tangential spoke to pass therethrough. Each retaining portion has a width that is so dimensioned smaller than the width of the insertion portion to retain the enlarged head of the tangential spoke therein. The external surface has a flute portion extending from each of the retaining portions to form a recess in the external surface adjacent each of the retaining portions. The retaining portions and the flute portions are dimensioned and configured to retain the bent ends of the spokes in the retaining portions of the first spoke openings.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
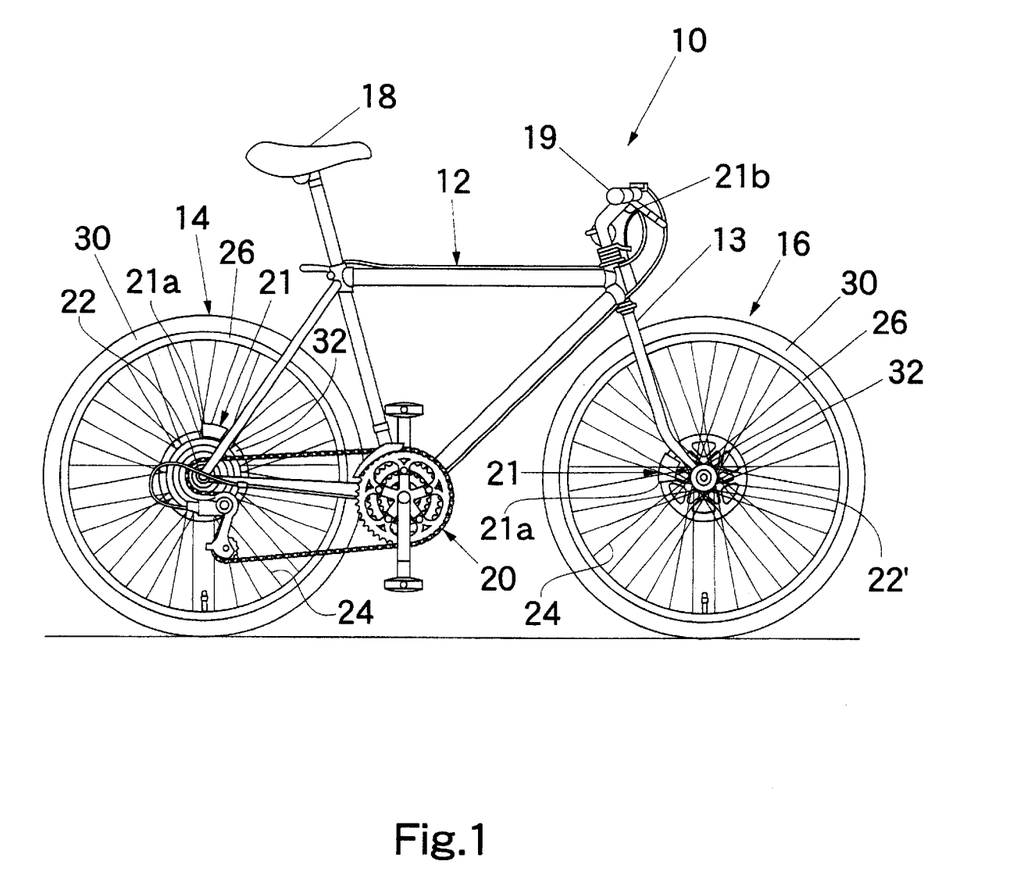
FIG. 1 is a side elevational view of a conventional bicycle with front and rear brake disc hubs in accordance with a first embodiment of the present invention.
Figure 2:
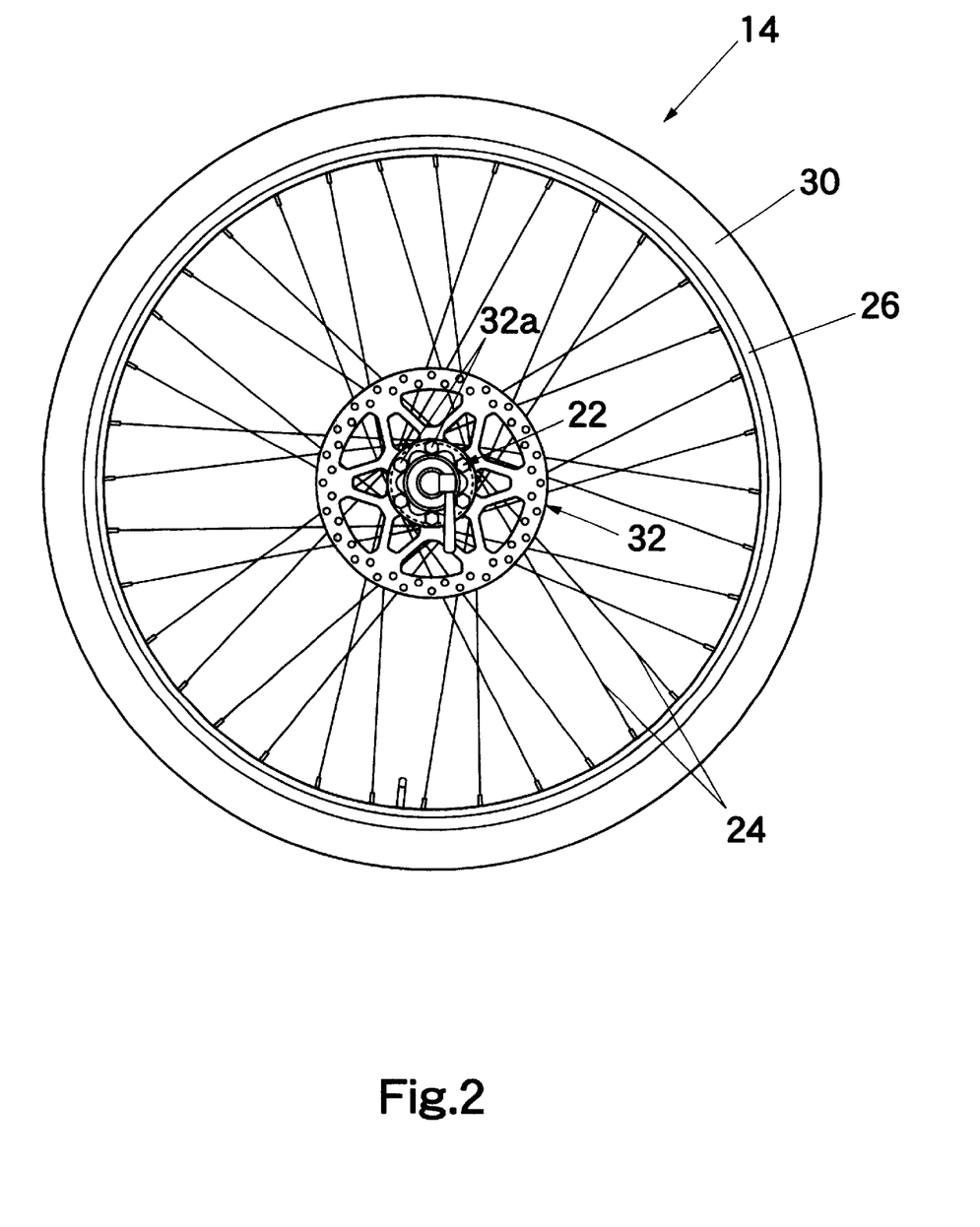
FIG. 2 is a side elevational view of the rear wheel of the bicycle illustrated in FIG. 1 with the sprockets removed.
Figure 3:
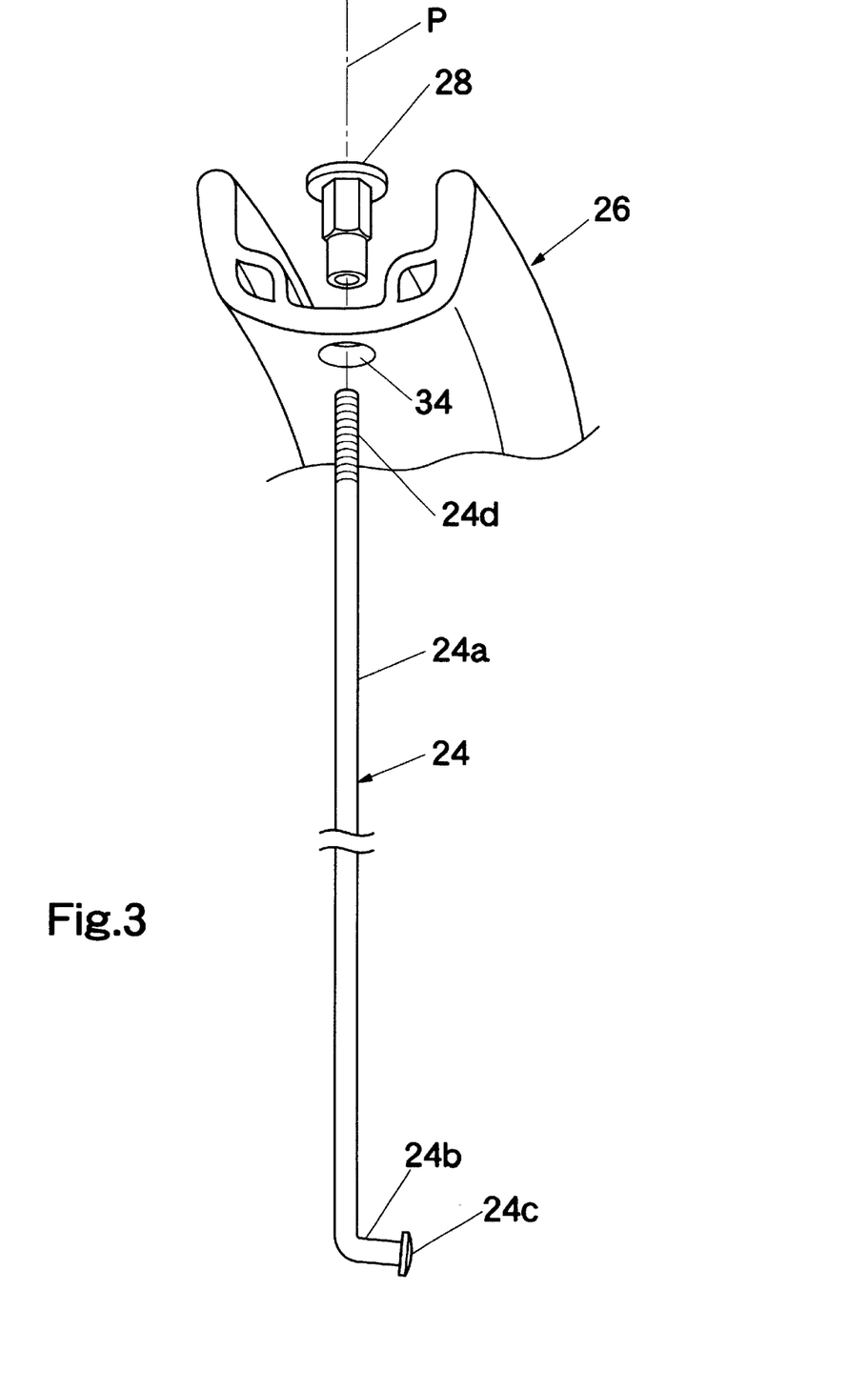
FIG. 3 is partially exploded perspective view of the rim, one of the spokes and one of the spoke nipples of the bicycle illustrated in FIG. 1.
Figure 4:
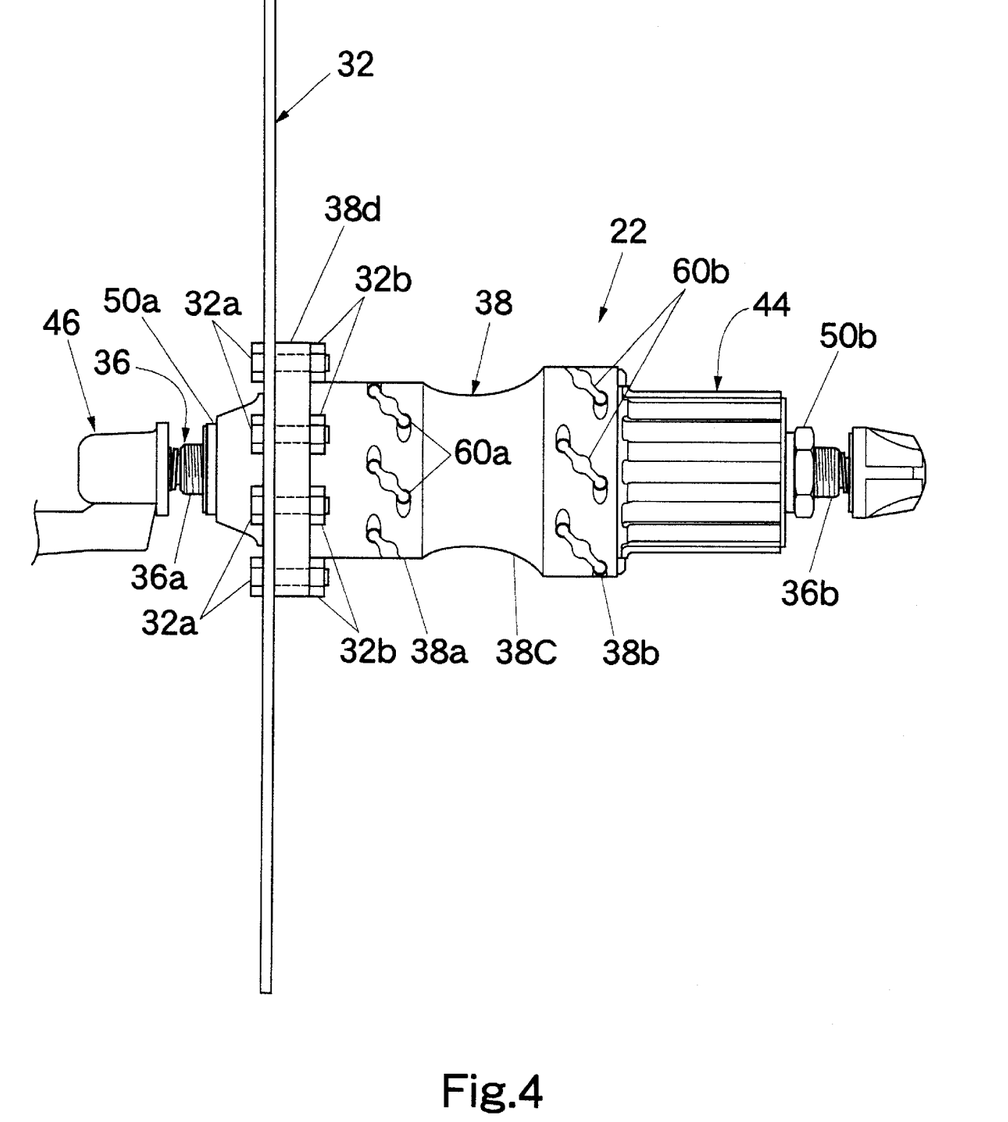
FIG. 4 is a side elevational view of the rear brake disc hub of the rear wheel illustrated in FIG. 2 with the sprockets removed.

Referring initially to FIGS. 1–3, a bicycle 10 is illustrated with certain parts being modified in accordance with the present invention as discussed below. The bicycle 10 basically has a frame 12 with a front fork 13 movably coupled thereto. A rear wheel 14 is rotatably coupled to a rear portion of the frame 12, while a front wheel 16 is rotatably coupled to the front fork 13. The frame 12 also has a seat 18 adjustably coupled to frame 12, a handlebar 19 coupled to the front fork 13 for turning the front wheel 16 and a drive train 20 for propelling the bicycle 10. The bicycle 10 is also provided with a pair of disc brake assemblies 21 having a caliper 21a and a brake lever 21b.

Since these parts of the bicycle 10 are well known in the art, these parts will not be discussed or illustrated in detail herein, except as they are modified in accordance with the present invention. Moreover, various conventional bicycle parts such as brakes, derailleurs, additional sprocket, etc., which are not illustrated and/or discussed in detail herein, can be used in conjunction with the present invention.

As seen in FIG. 2, the rear wheel 14 has a rear hub 22, a plurality of spokes 24 extending outwardly from the rear hub 22, a rim 26 coupled to the outer ends of spokes 24 by spoke nipples 28, and a tire 30 located on the outer surface of rim 26. The rear hub 22 is also provided with a brake disc rotor 32 that is attached to the rear hub 22 by six bolts 32a and six nuts 32b, as explained below. It will be apparent to those skilled in the art from this disclosure that a variety of spoke arrangements are possible without departing from the present invention. For example, a twenty-four spoke wheel, a twenty-eight spoke wheel, a thirty-two spoke wheel, a thirty-six spoke wheel or a forty spoke wheel can be constructed in accordance with the present invention without departing from the present invention. Basically, the number of spokes depends upon the rim (which is conventional) and the arrangement (number) of spoke openings of the hub of the present invention. In any event, conventional spoking arrangements are utilized with the hub of the present invention.

Preferably, the spokes 24, the rim 26 and spoke nipples 28 are all conventional parts that are used with the rear hub 22 of the present invention as seen in FIG. 3. In other words, the unique design of the rear hub 22 allows it to be used with conventional parts, e.g., tangential spokes 24 and a conventional rim 26. Accordingly, when the rear wheel 14 is assembled, the spokes 24 extend tangentially from an imaginary circle centered on the center axis of rotation of rear hub 22. Preferably an even number of spokes 24 are coupled to rim 26 in a conventional spoking arrangement (with the outer ends circumferentially equally spaced from each other). Moreover, the number of spokes corresponds to two times the number of spoke openings of rear hub 22, as discussed below in more detail.

The term "tangential spokes" are spokes that have a straight section 24a and a bent end 24b with an enlarged head 24c such that straight section 24a extends at an angle of about 95° relative to the bent end 24b. Such spokes are well known in the bicycle art. As seen in FIG. 3, the spokes 24 of the illustrated embodiment each have an outer threaded end 24d that is located at the opposite end of the center straight section 24a from the bent end 24b (inner end portion) with the enlarged head 24c. The bent end 24b has a center axis that forms an angle of about 95° with the center axis of the straight section 24a. The bent ends 24b of the spokes 24 are designed to be received within the first and second spoke openings. In particular, the enlarged heads 24c of the spokes 24 engage an interior surface of the hub body 38 with the straight sections 24a extending substantially tangentially to an imaginary circle with a center on the center axis of rotation of the rear hub 22.

The rim 26 can be any conventional rim that has a plurality of spoke holes 34 for receiving the spoke nipples 28 for attaching the outer threaded ends 24d of the spokes 24 thereto. In the illustrated embodiment, the rim 26 is a conventional steel or alloy rim having a U-shaped cross section with the spoke holes 34 formed therein. The spoke holes 34 are equally spaced apart in a circumferential direction. The spoke holes 34 preferably lie in a single plane P that divides the cross section in half as seen in FIG. 3. Of course, rims with fewer or more spoke holes 34 can be used with a hub of the present invention, if needed and/or desired. For example, the rim 26 can have twenty-four, twenty-eight, thirty two, thirty-six or forty spoke holes depending on the number of spoke openings of the rear hub 22 as explained below.

Figure 5:
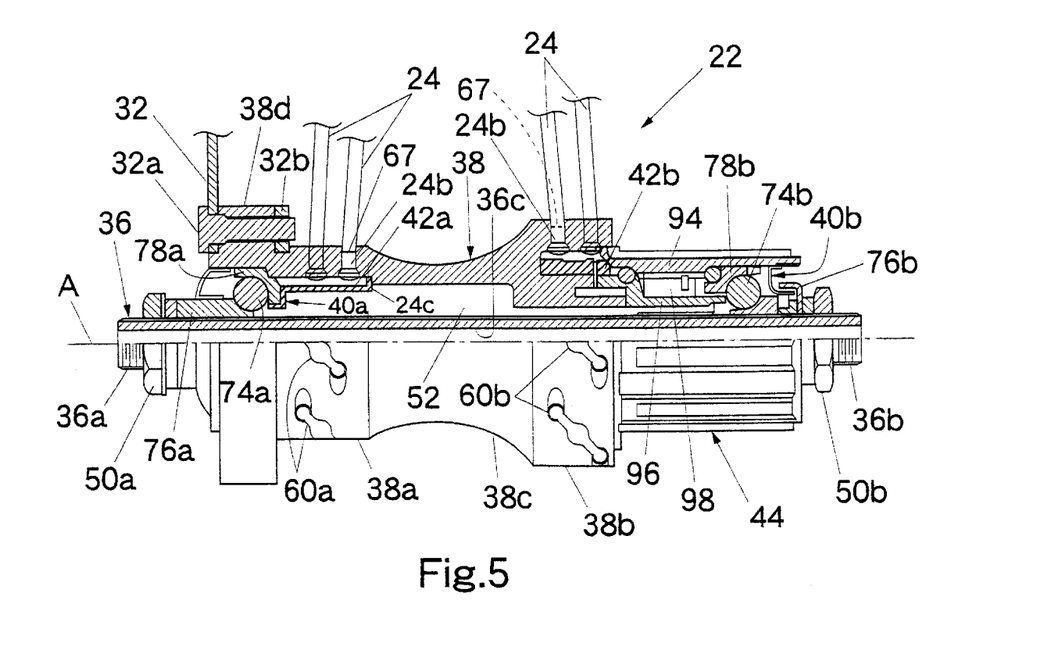
FIG. 5 is a side elevational view of the rear brake disc hub of the rear wheel illustrated in FIG. 3 with certain portions broken away for purposes of illustration.

As best seen in FIG. 5, the rear hub 22 basically includes a hub axle 36, a hub body or shell 38, a freewheel 44 and a quick release mechanism 46. Of the parts of rear hub 22, only the hub body 38 is a non-conventional part. The remaining parts of rear hub 22 are relatively conventional, and thus, the remaining parts of rear hub 22 will not be discussed or illustrated in detail herein.

Of course, it will be apparent to those skilled in the art that the front hub 22' is preferably constructed in accordance with the present invention. In other words, the front hub 22' has the same basic construction of the rear hub 22, except that the front hub 22' does not have a freewheel. Thus, the construction of the front hub 22' will not be discussed or illustrated in detail herein.

As seen in FIG. 5, the hub axle 36 has a center axis A extending between a first end 36a and a second end 36b. The quick release mechanism 46 extends through a center bore 36c of the hub axle 36 such that the quick release mechanism 46 is coupled to the hub axle 36 in a conventional manner. The first and second ends 36a and 36b of the hub axle 36 are threaded for receiving a pair of nuts 50a and 50b that apply an axial force on the hub body 38, the bearing assemblies 40a and 40b and the freewheel 44. The first and second bearing assemblies 40a and 40b rotatably mount the hub body 38 with the freewheel 44 on the hub axle 36. The freewheel 44 allows the hub body 38 to rotate freely relative to the rear sprockets (not shown) in one direction, but fixedly couples the rear sprockets relative to the hub body 38 in the opposite rotational direction in a conventional manner.

The hub body 38 is illustrated in accordance with the present invention. In this embodiment, the hub body 38 is a hollow member that defines an interior passageway 52 with the hub axle 36 being rotatably supported therein by the first and second bearing assemblies 40a and 40b. Thus, the hub body 38 is a substantially tubular member. Specifically, the hub body 38 has a center tubular portion 38c with first and second end sections 38a and 38b being integrally formed with the center tubular portion 38c as a one-piece, unitary member. The first end section 38a has an integrally mounted brake rotor attachment portion 38d, while a second end section 38b has the freewheel 44 fixedly coupled thereto.

As seen in FIGS. 8–19, the hub body 38 has a set of first spoke openings 60a provided at the first end section 38a of the hub body 38 for receiving the bent ends 24b of the spokes 24. Similarly, the second end section 38b of the hub body 38 is provided with a second set of spoke openings 60b for receiving the bent ends 24b of the spokes 24. The number of spoke openings 60a and 60b will depend on the configuration of the rim 26 and the number of spokes 24. The total number of spoke openings 60a and 60b is half the total number of spokes 24. First end section 38a preferably has a slightly smaller diameter (internal and external diameters) than second end section 38b. The first and second end sections 28a and 28b preferably have the same radial thickness and are relatively thick, as discussed below in more detail. The spoke openings 60a and 60b are equally spaced apart about the circumference of the hub body 38. Preferably, the number of first spoke openings 60a is equal to the number of second spoke openings 60b. Of course, the number of first spoke openings 60a can be different from the number of second spoke openings 60b. In any event, each of the spoke openings 60a and 60b are designed to receive two spokes 24 as explained below. Accordingly, the rear hub 22 is designed to have a plurality of spokes extending outwardly therefrom in a generally tangential direction.

Preferably, the first and second sets of spoke openings 60a and 60b are substantially identical. The first and second spoke openings 60a and 60b are designed to be used with conventional tangential spokes 24. Of course, it is possible that the first and second sets of spoke openings 60a and 60b can be different such that tangential spokes 24 are used in one end of the hub body 38 and different types of spokes are used in the other end of the hub body 38. The first spoke openings 60a are circumferentially arranged around the hub body 38 adjacent to the brake rotor attachment portion 38d. Preferably, the first spoke openings 60a are spaced axially inward of the brake rotor attachment portion 38d so that brake disc rotor 32 can be easily attached with the bolts 32a and nuts 32b.

In this embodiment, the first and second spoke openings 60a and 60b are elongated slots that are each provided with an insertion portion 61 and a pair of retaining portions 62. Accordingly, each of the spoke openings 60a and 60b is designed to have a pair of spokes 24 retained therein with the spokes 24 extending in opposite directions.

The insertion portion 61 of each spoke opening is located between the pair of retaining portions 62 of each spoke opening. Each insertion portion 61 is formed by a pair of opposed curved surfaces 64 that are spaced apart so as to be equal to or slightly larger than the widths or diameters of the enlarged heads 24c of the spokes 24. Thus, the inner ends (bent ends 24b with enlarged heads 24c) of the spokes 24 can be easily inserted into the spoke openings 60a and 60b through the insertion portions 61.

The retaining portions 62 have smaller widths or diameters than the insertion portions 61. More specifically, the diameters or widths of the retaining portions 62 are smaller than the diameters or widths of the enlarged heads 24c of the spokes 24 so as to retain the spokes 24 within the spoke openings 60a and 60b. The retaining portions 62 are each preferably defined by a partial cylindrical surface 66 that is connected to the curved surfaces 64 of the associated insertion portion 61 by a pair of straight surfaces 68.

The internal surface of hub body 38 preferably includes a plurality of internal head receiving seats 63 located adjacent the retaining portions 62 of the first and second spoke openings 60a and 60b. An internal abutment 65 is arranged between each of the insertion portions 61 and each of the head receiving seats 63. Preferably, two internal abutments 65 are arranged between each of the insertion portions 61 and each of the head receiving seats 63. Each of the internal abutments 65 are spaced a distance from the outer surface of the hub body 38 larger than a length of the bent ends 24b of each of the spokes 24. Thus, the bent ends 24b of the spokes 24 are retained in the retaining portions 62 of the first and second spoke openings 60a and 60b.

Each of the head receiving seats 63 is basically formed as a recess with a head contact surface 63a. The head contact surface 63a of the head receiving seat 63 is spaced a distance from the external surface of the hub body 38 not larger than the corresponding length of the bent ends 24b of the spokes 24. Each of the head receiving seats 63 extends inwardly from the internal surface of the hub body 38 along a respective center axis $C_2$ of the respective retaining portion 62. More specifically, each head contact surface 63a is spaced from flute portions 67 formed in the external surface of the hub body 38, as discussed in more detail below. Each of the head contact surfaces 63a is spaced radially outwardly from the internal surface of the hub body 38 such that the internal surface of the hub body 38 forms the internal abutments 65. Preferably, the head contact surfaces 63a are frustoconical surfaces that correspond to the shapes of the bent ends 24b of the spokes 24.

The hub body 38 has a thickness adjacent the first and second spoke openings 60a and 60b larger than the length of the bent portions 24b of the spokes 24. However, the effective thickness of the hub body 38 is reduced due to the head receiving seats 63 and the flute portions 67. In any event, the external surface of the hub body 38, the head receiving seats 63 and the abutments 65 are dimensioned and configured to retain the bent ends 24b of the spokes 24 in the retaining portions 62 of the first and second spoke openings 60a and 60b. In other words, each of the head contact surfaces 63a of the head receiving seats 63 is spaced a distance from each of the flute portions 67 not larger than the length of the bent portions 24b of the spokes 24. Thus, the flute portions 67 hold the spokes 24 at the correct orientation.

Figures 9, 10:
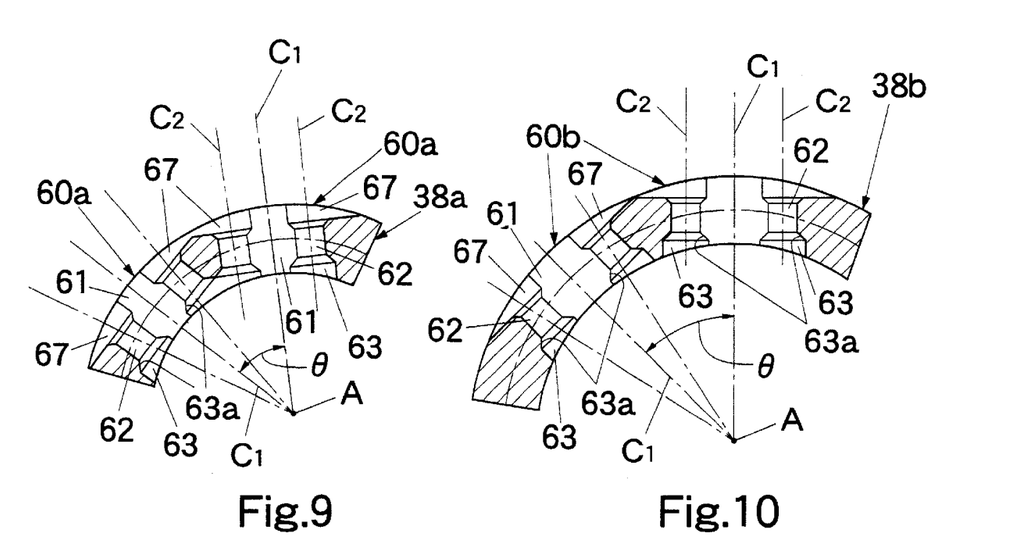
FIG. 9 is a partial transverse cross-sectional view of the rear brake disc hub body illustrated in FIGS. 4, 5 and 8 as seen along section line 9—9 of FIG. 8.
FIG. 10 is a partial transverse cross-sectional view of the rear brake disc hub body illustrated in FIGS. 4, 5 and 8 as seen along section line 10—10 of FIG. 8.
Figure 11:
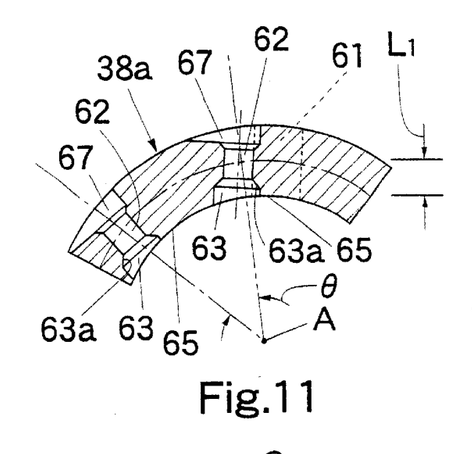
FIG. 11 is a partial transverse cross-sectional view of the rear brake disc hub body illustrated in FIGS. 4, 5 and 8 as seen along section line 11—11 of FIG. 8.
Figure 17:
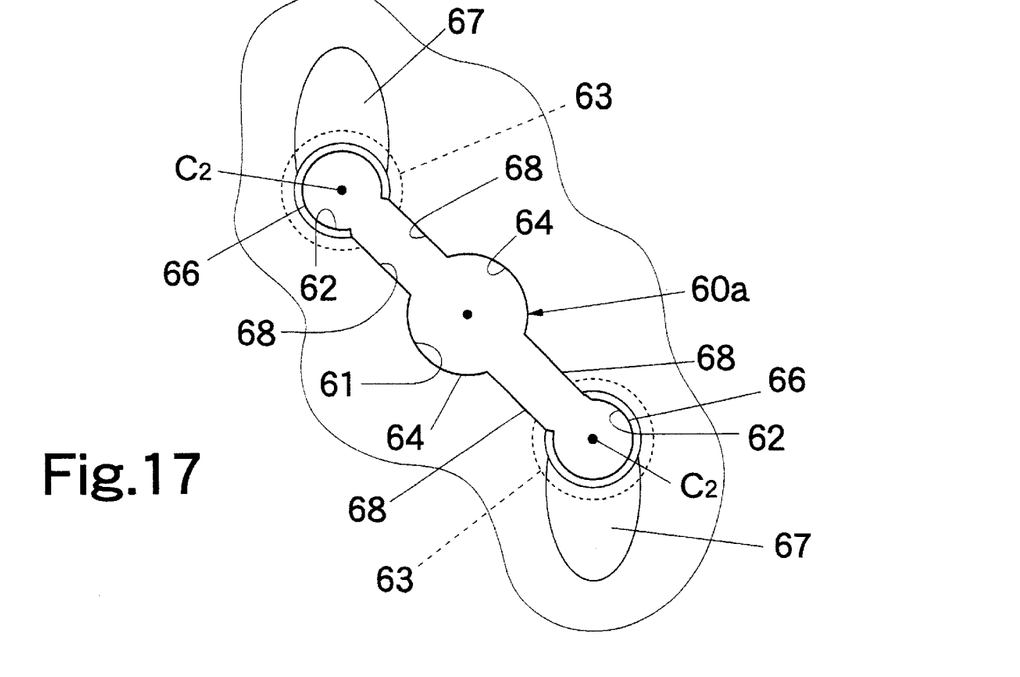
FIG. 17 is an enlarged, partial outside elevational view of one of the spoke openings of the rear brake disc hub body illustrated in FIGS. 4, 5 and 8.
Figure 18:
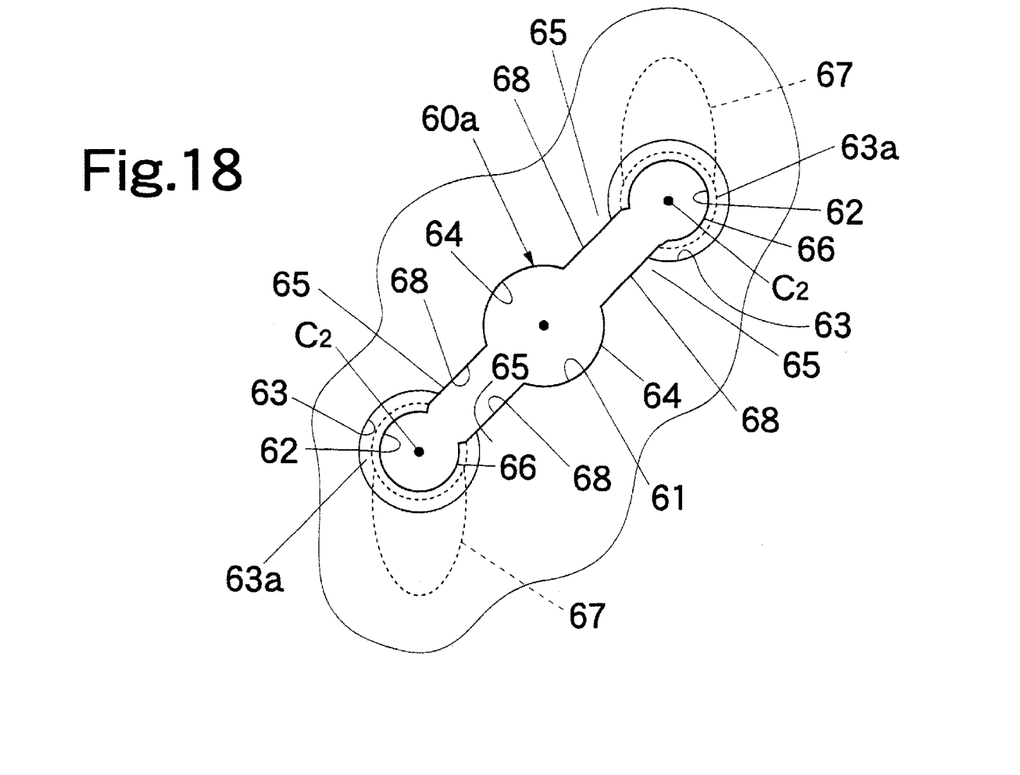
FIG. 18 is an inside elevational view of the spoke opening illustrated in FIG. 17.
Figure 19:
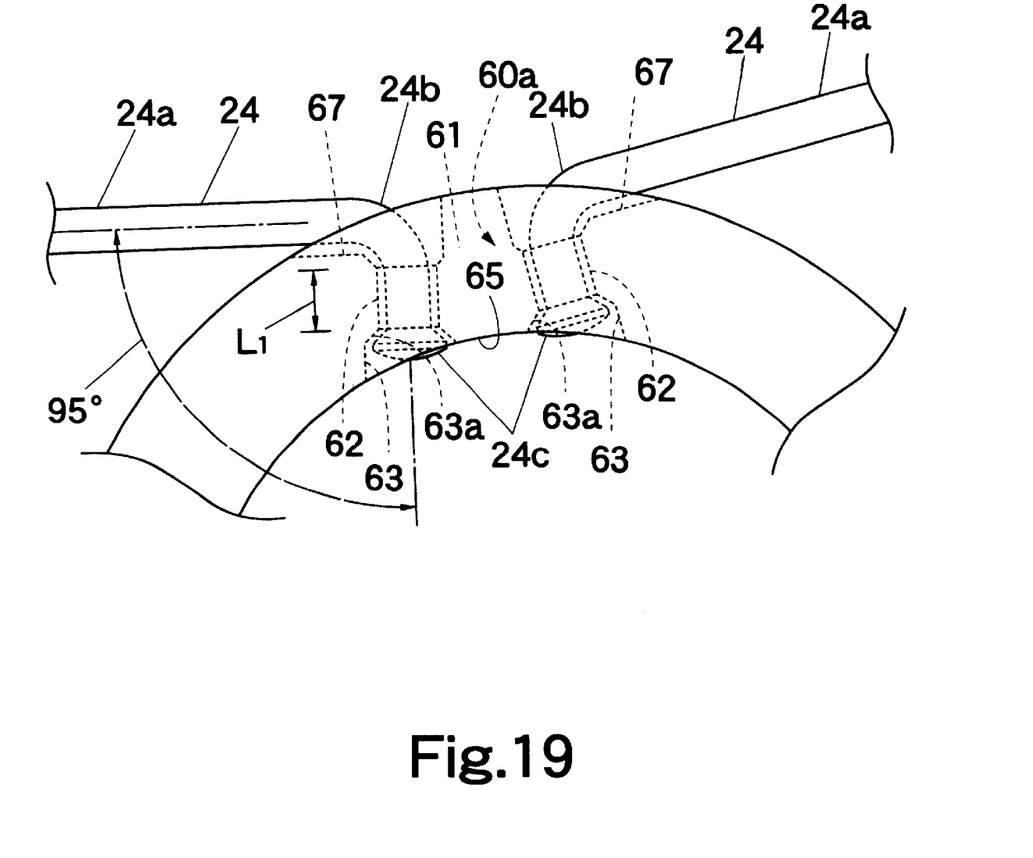
FIG. 19 is an enlarged, schematic view of portion of the rear brake disc hub body illustrated in FIGS. 4, 5 and 8 with two spokes extending outwardly therefrom.

As best seen in FIGS. 9 and 10, the flute portions 67 are formed in the external surface of the hub body 38 and extend tangentially outward from each of the retaining portions 62. Thus, the flute portions 67 form a plurality of recesses in the external surface adjacent each of the retaining portions 62 as best seen in FIGS. 17 and 18. The retaining portions 62 and the flute portions 67 are dimensioned and configured to retain the bent ends 24b of the spokes 24 in the retaining portions 62 of the first and second spoke openings 60a and 60b. More specifically, each flute portion 67 includes a concave curved surface configured to allow the inner end of each straight section 24a of each spoke 24 to be recessed and retained therein. Each of the flute portions 67 extends at substantially a right angle relative to respective center longitudinal axes $C_2$ of each of the retaining portions 62. The flute portions 67 are angled relative to the overall length of the spoke openings 60a and 60b so that any axial force on the spokes 24 does not cause the spoke to move into the insertion portions 61. Moreover, the flute portions 67 are angled relative to a plane that is perpendicular to the axis A.

The spokes 24 are installed in the spoke openings by first inserting the inner ends (bent ends 24b with enlarged heads 24c) of the spokes 24 into the insertion portions 61 of the spoke openings 60a and 60b. Next, the spokes 24 are pulled into the retaining portions 62 of the spoke openings 60a and 60b such that the straight portions 24a of the spokes 24 rest in the flute portions 67. The internal abutments 65 and the flute portions 67 cooperate together to hold the spokes 24 in the retaining portions 62 of the spoke openings 60a and 60b at the correct orientation.

The spoke openings 60a and 60b are formed as elongated slots that are angled relative to the axis A. Accordingly, the insertion portions 61 are arranged in a circumferential pattern with one set of the retaining portions 62 being located axially outward from the insertion portions 61 and the other set of retaining portions 62 being spaced axially inward from the insertion portions 61. In other words, a first set of retaining portions 62 form an outer circumferential row of the retaining portions 62, and a second set of the retaining portions 62 form an inner circumferential row of retaining portions 62 with the insertion portions 61 being located between the rows of retaining portions 62.

Preferably, the insertion portion 61 and the retaining portions 62 of each spoke opening are formed simultaneously. Also preferably, the inner and outer ends of the retaining portions 62 of the spoke openings 60a and 60b are tapered to avoid sharp edges engaging the spokes 24. Each retaining portion 61 has a length $L_1$ slightly smaller than a length of each bent end 24b of each spoke 24 received therein. The thickness of each end portion 38a and 38b has a thickness larger than the length of each bent end 24b of each spoke 24. The length $L_1$ is measured between the internal and external edges of the external and internal tapered surfaces of each retaining portion 62, respectively. As mentioned above, the retaining portions 62 of the spoke openings 60a and 60b are preferably equally spaced apart in the circumferential direction. Thus, the center points of the retaining portions 62 of the spoke openings 60a and 60b are spaced apart by an angle θ. The valve of angle θ depends on the number of spokes being used. The insertion portions 61 are also are spaced apart by an angle θ.

Figure 12:
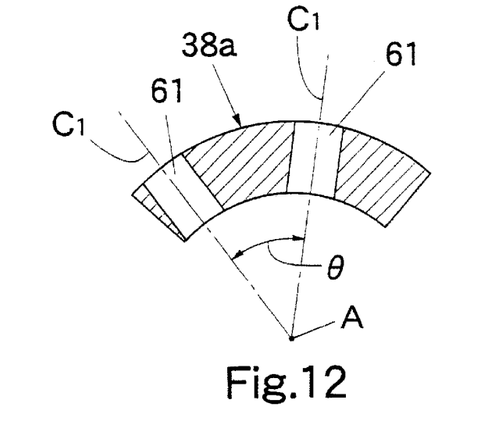
FIG. 12 is a partial transverse cross-sectional view of the rear brake disc hub body illustrated in FIGS. 4, 5 and 8 as seen along section line 12—12 of FIG. 8.
Figure 13:
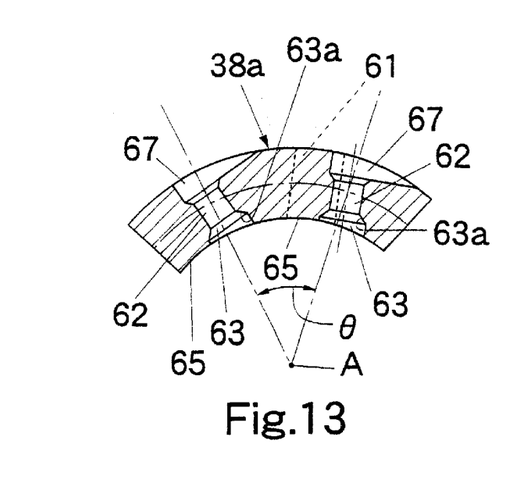
FIG. 13 is a partial transverse cross-sectional view of the rear brake disc hub body illustrated in FIGS. 4, 5 and 8 as seen along section line 13—13 of FIG. 8.
Figure 14:
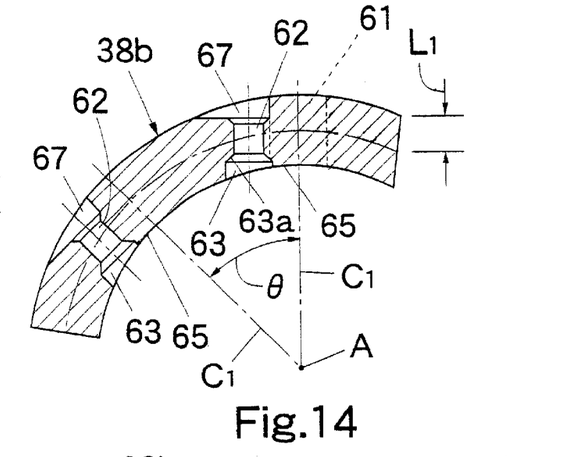
FIG. 14 is a partial transverse cross-sectional view of the rear brake disc hub body illustrated in FIGS. 4, 5 and 8 as seen along section line 14—14 of FIG. 8.
Figure 15:
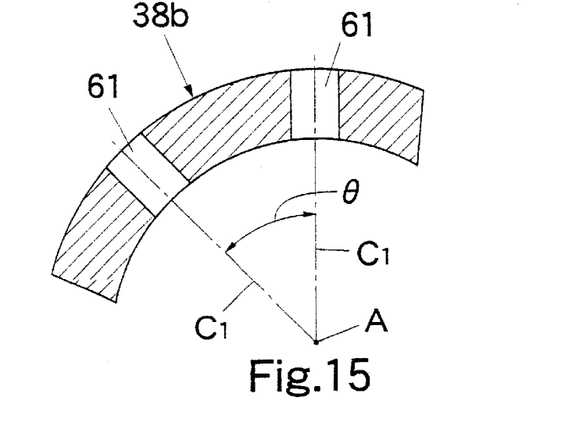
FIG. 15 is a partial transverse cross-sectional view of the rear brake disc hub body illustrated in FIGS. 4, 5 and 8 as seen along section line 15—15 of FIG. 8.
Figure 16:
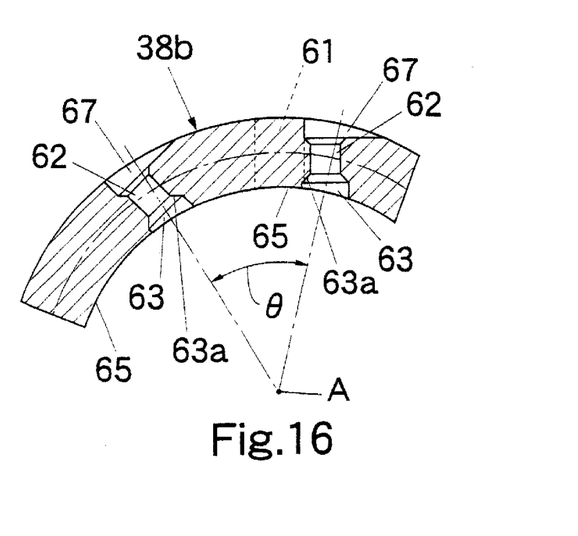
FIG. 16 is a partial transverse cross-sectional view of the rear brake disc hub body illustrated in FIGS. 4, 5 and 8 as seen along section line 16—16 of FIG. 8.

Each of the insertion portions 61 has a center longitudinal axis $C_1$, that passes through the center axis A of the hub axle 36 as best seen in FIGS. 12 and 15. The retaining portions 62, on the other hand, have center longitudinal axes $C_2$ do not pass through the center axis A of the hub axle 36. Rather, the center longitudinal axes $C_2$ of the retaining portions 62 are parallel to the center longitudinal axis $C_1$ of the insertion portion 61 for each of the spoke openings 60a and 60b. This angled configuration of the retaining portions 62 results in the straight sections 24a of the spokes 24 being easily arranged in a tangential direction relative to an imaginary circle centered on the hub body 38. Moreover, this angled configuration of the retaining portions 62 allows the straight sections 24a of the spokes 24 to be easily aligned with the spoke holes 34 of the rim 26 without significant bending of the spokes 24. In the illustrated embodiment, the spokes 24 are not bent more than about five degrees. Of course, the less the spokes 24 are bent the better.

If the retaining portions 62 were formed with their center axis passing through the center axis A of the hub axle 36, then the conventional spokes 24 would be placed under excessive bending forces, which could result in the spokes 24 breaking during use of the wheel. In contrast, with the retaining portions 62 of the spokes 24 being angled, the amount of bending of the spokes 24 can be reduced and/or eliminated.

Figure 6:
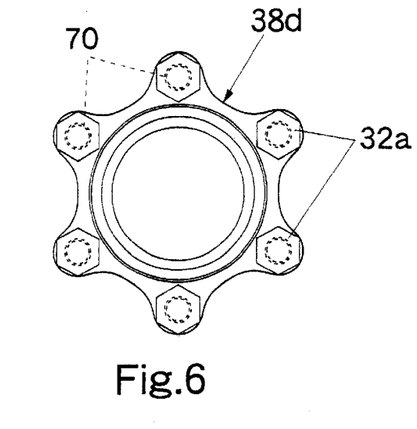
FIG. 6 is a left end elevational view of the rear brake disc hub body illustrated in FIGS. 4 and 5 with the brake disc rotor bolts mounted thereto.
Figure 7:
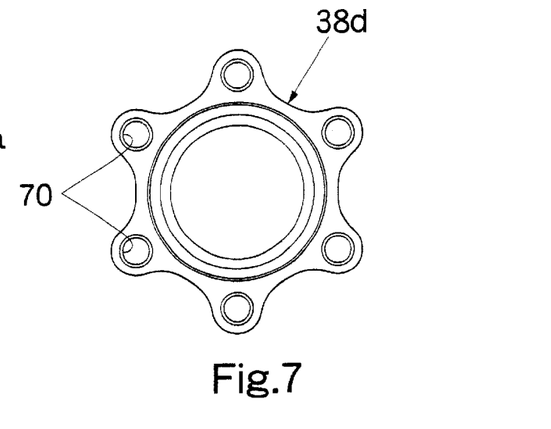
FIG. 7 is a left end elevational view of the rear brake disc hub body illustrated in FIGS. 4 and 5 with the brake disc rotor bolts removed.
Figure 8:
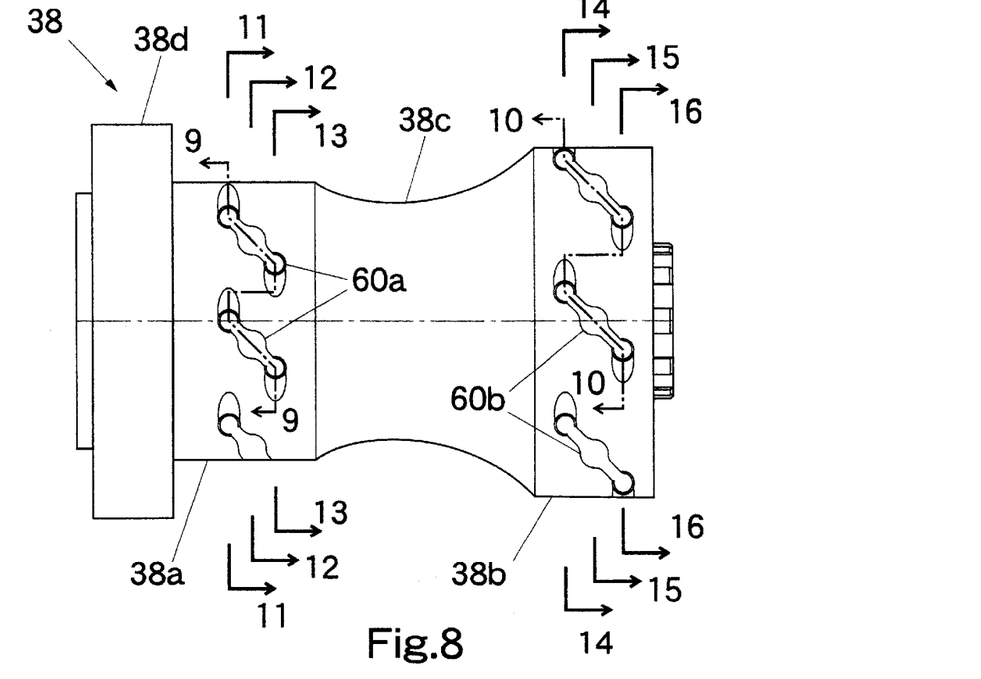
FIG. 8 is an enlarged side elevational view of the rear brake disc hub body of the rear brake disc hub illustrated in FIGS. 4 and 5 with the rotor removed.

Referring to FIGS. 5–7, the brake rotor attachment portion 38d is integrally formed with the center tubular portion 38c of the hub body 38 as a one-piece, unitary member. In the illustrated embodiment, the brake rotor attachment portion 38d is formed with six attachment members or points with threaded through bores 70. While six individual attachment points are illustrated, it will be apparent to those skilled in the art from this disclosure that fewer or more attachment points can be utilized. Moreover, it will be apparent to those skilled in the art from this disclosure that the attachment portions could be a continuous flange, if needed and/or desired.

The through bore 70 can be threaded or unthreaded. By using through bores 70 instead of blind bores, the rear hub 22 can be easily manufactured at a relatively lower cost. In the case of unthreaded through bores (not shown), the bolts 32a extend into openings in the brake disc rotor 32 and then through the through bores. The free ends of the bolts 32a have nuts 32b threaded thereon for attaching the brake disc rotor 32 to the hub body 38. This arrangement allows the hub body 38 and the brake rotor attachment portion 38d to be formed out of the same a lightweight material, such as aluminum. In this arrangement, the hub body 38 does not need to be replaced if the through bores 70 become damaged.

In the case of threaded through bores 70 (of the illustrated embodiment), the bolts 32a extend into openings in the brake disc rotor 32 and then threaded into the through bores 70. Optionally, the free ends of the bolts 32a can have the nuts 32b threaded thereon for more securely attaching the brake disc rotor 32 to the hub body 38. In this arrangement, if the threads of through bores 70 become damaged, the hub body 38 does not need to be replaced. Rather, the bolts 32a and the nuts 32b securely attach the brake disc rotor 32 to the hub body 38.

Bearing assemblies 40a and 40b rotatably supports hub body 38 on hub axle 36. The bearing assembly 40a basically includes a plurality of balls 74a located between an inner race member 76a and an outer race member 78a. Similarly, the bearing assembly 40b basically includes a plurality of balls 74b located between an inner race member 76b and an outer race member 78b. Since bearing assemblies 40a and 40b are well known in the bicycle art, they will not be discussed or illustrated in detail herein.

A pair of spoke seals 42a and 42b are arranged in the interior passageway 52 of the hub body 38 so as to be adjacent the spoke openings 60a and 60b to isolate the spoke openings 60a and 60b from the hub axle 36, and/or parts of the freewheel 44. In other words, the spoke seals 42a and 42b prevent contaminants from entering the rear hub 22 through the spoke openings 60a and 60b. The spoke seals 42a and 42b are preferably resilient members that are constructed of rubber or the like. Of course, it will be apparent to those skilled in the art from this disclosure that the seals could be created from other types of materials, depending upon their shape and arrangement.

In the illustrated embodiment, the spoke seal 42a has a tubular section and a pair of ends. The ends are configured to engage an abutment of the inner surface of the hub body 38 (at an inner end), and an inner surface of the outer race of bearing assembly 40a. Of course, the particular shape of the ends of spoke seal 42a will vary depending on the shape of the hub body 38 and its internal components. In any event, when the rear hub 22 is assembled, an axial force is applied to the ends of the spoke seal 42a to form annular seals therebetween. Thus, the spoke seal 42a forms an isolated area beneath the spoke openings 60a. This isolated area beneath the spoke openings 60a is a continuous annular space.

Similar to the spoke seal 42a, the spoke seal 42b forms an isolated area beneath the spoke openings 60b. Thus, contaminates are prevented from entering rear hub 22. The isolated area beneath the spoke openings 60b is a continuous annular space. The exact structure of seals 42a and 42b are not critical to the present invention. Thus, seals 42a and 42b will not be discussed or illustrated in detail herein.

The freewheel, such as the freewheel 44, are well known in the bicycle art, and thus, the freewheel 44 will not be illustrated or discussed in detail herein. The freewheel 44 is used to transmit a driving force from the chain to the rear bicycle wheel in one rotation direction only. The freewheel 44 allows the bicycle 10 to advance freely without any rotation of the pedals. The freewheel 44 is fastened to the rear hub 22 as integral part of the rear hub 22 in a conventional manner. The freewheel 44 has an outer tubular part 94, an inner tubular part 96 and a one-way clutch 98. The inner tubular part 96 is installed radially inwardly of the outer tubular part 94 so that the inner tubular part 96 is free to rotate relative to the outer tubular part 94. The one-way clutch 98 is installed between the outer tubular part 94 and inner tubular part 96 for transmitting the driving force from the outer tubular part 94 to the inner tubular part 96 in one rotational direction only. The outer tubular part 94 has a plurality of gears or sprockets (not shown) mounted thereon, while the inner tubular part 96 is usually mounted on the hub axle 36.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub for use with tangential bicycle spokes having a straight section and a bent end with an enlarged head such that straight section extends at an angle of about 95° relative to the bent end, said bicycle hub comprising:

a hub axle having a center axis extending between a first end and a second end; and a hub body having an interior passageway with said hub axle being rotatably supported therein, an external surface, an internal surface and a set of first spoke openings circumferentially arranged around said hub body and extending between said external and internal surfaces, each of said first spoke openings having an insertion portion with a large width that is so dimensioned to permit the enlarged head of a tangential spoke to pass therethrough and a retaining portion with a width that is so dimensioned smaller than said width of said insertion portion to retain the enlarged head of the tangential spoke therein, said internal surface having an internal head receiving seat located adjacent each of said retaining portions of said first spoke openings and an internal abutment arranged between each of said insertion portions and each of said head receiving seats.

2. The bicycle hub according to claim 1, wherein each of said internal abutments being spaced a distance from said outer surface of said hub body larger than a length of the bent end of each of the spokes to retain the bent ends of the spokes in said retaining portions of said first spoke openings.

3. The bicycle hub according to claim 1, wherein each of said head receiving seats includes a recess extending inwardly from said internal surface along a center axis of each of said retaining portions.

4. The bicycle hub according to claim 1, wherein each of said head receiving seats includes a contact surface spaced radially outwardly from said internal surface of said hub body such that said internal surface of said hub body forms said abutments.

5. The bicycle hub according to claim 1, wherein said internal surface of said hub body includes a pair of said abutments arranged between said retaining portion and said insertion portion of each of said first spoke openings.

6. The bicycle hub according to claim 1, wherein said hub body has a thickness adjacent said first spoke openings larger than the length of the bent portions of the spokes.

7. The bicycle hub according to claim 1, wherein said external surface has a flute portion extending from each of said retaining portions to form a recess in said external surface adjacent each of said retaining portions.

8. The bicycle hub according to claim 7, wherein each of said head receiving seats includes a head contact surface spaced a distance from each of said flute portions not larger than the length of the bent portions of the spokes.

9. A bicycle hub for use with tangential bicycle spokes having a straight section and a bent end with an enlarged head such that straight section extends at an angle of about 95° relative to the bent end, said bicycle hub comprising:

a hub axle having a center axis extending between a first end and a second end; and a hub body having an interior passageway with said hub axle being rotatably supported therein, an external surface, an internal surface and a set of first spoke openings circumferentially arranged around said hub body and extending between said external and internal surfaces, each of said first spoke openings having an insertion portion with a large width that is so dimensioned to permit the enlarged head of a tangential spoke to pass therethrough and a retaining portion with a width that is so dimensioned smaller than said width of said insertion portion to retain the enlarged head of the tangential spoke therein, said internal surface having an internal head receiving seat located adjacent each of said retaining portions of said first spoke openings and an internal abutment arranged between each of said insertion portions and each of said head receiving seats, said external surface, said head receiving seats and said abutments being dimensioned and configured to retain the bent ends of the spokes in said retaining portions of said first spoke openings.

10. The bicycle hub according to claim 9, wherein each of said head receiving seats includes a recess extending inwardly from said internal surface along a center axis of each of said retaining portions.

11. The bicycle hub according to claim 9, wherein each of said head receiving seats includes a contact surface spaced radially outwardly from said internal surface of said hub body such that said internal surface of said hub body forms said abutments.

12. The bicycle hub according to claim 9, wherein said internal surface of said hub body includes a pair of said abutments arranged between said retaining portion and said insertion portion of each of said first spoke openings.

13. The bicycle hub according to claim 9, wherein said hub body has a thickness adjacent said first spoke openings larger than the length of the bent portions of the spokes.

14. The bicycle hub according to claim 9, wherein said external surface has a flute portion extending from each of said retaining portions to form a recess in said external surface adjacent each of said retaining portions.

15. The bicycle hub according to claim 14, wherein each of said head receiving seats includes a head contact surface spaced a distance from each of said flute portions not larger than the length of the bent portions of the spokes.

16. A bicycle hub for use with tangential bicycle spokes having a straight section and a bent end with an enlarged head such that straight section extends at an angle of about 95° relative to the bent end, said bicycle hub comprising:

a hub axle having a center axis extending between a first end and a second end; and a hub body having an interior passageway with said hub axle being rotatably supported therein, an external surface, an internal surface and a set of first spoke openings circumferentially arranged around said hub body and extending between said external and internal surfaces, each of said first spoke openings having an insertion portion with a large width that is so dimensioned to permit the enlarged head of a tangential spoke to pass therethrough and a retaining portion with a width that is so dimensioned smaller than said width of said insertion portion to retain the enlarged head of the tangential spoke therein, said external surface having a flute portion extending from each of said retaining portions to form a recess in said external surface adjacent each of said retaining portions, said retaining portions and said flute portions being dimensioned and configured to retain the bent ends of the spokes in said retaining portions of said first spoke openings.

17. The bicycle hub according to claim 16, wherein each of said flute portions includes a concave curved surface.

18. The bicycle hub according to claim 16, wherein each of said flute portions extends at substantially a right angle relative to a center longitudinal axis of each of said retaining portions.

19. The bicycle hub according to claim 18, wherein said internal surface has an internal head receiving seat located adjacent each of said retaining portions and an internal abutment arranged between each of said insertion portions and each of said head receiving seats.

20. The bicycle hub according to claim 19, wherein each of said head receiving seats includes a head contact surface spaced a distance from each of said flute portions not larger than the length of the bent portions of the spokes.

21. The bicycle hub according to claim 16, wherein said internal surface includes a head contact surface adjacent each of said retaining portions that is spaced a distance from each of said flute portions not larger than the length of the bent portions of the spokes.

* * * * *